US012600898B2

(12) United States Patent
 Khalil De Oliveira et al.

(10) Patent No.: US 12,600,898 B2
(45) Date of Patent: Apr. 14, 2026

(54) MICROEMULSION COMPOSITION TO INCREASE INJECTIVITY OF WATER PRODUCED IN RESERVOIRS

(71) Applicant: Petróleo Brasileiro S.A.—Petrobras, Rio de Janeiro (BR)

(72) Inventors: Marcia Cristina Khalil De Oliveira, Rio de Janeiro (BR); Igor Domingos Rodrigues, Rio de Janeiro (BR); Rafaella Magliano Balbi De Faria, Rio de Janeiro (BR); Carmen Lucia Da Silva Teixeira, Rio de Janeiro (BR); Daniele Fraga Santana Miranda, Petrópolis (BR); Aline Machado De Azevedo Novaes, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 18/340,430

(22) Filed: Jun. 23, 2023

(65) Prior Publication Data

US 2023/0332039 A1 Oct. 19, 2023

Related U.S. Application Data

(63) Continuation of application No. 17/885,797, filed on Aug. 11, 2022, now abandoned.

(30) Foreign Application Priority Data

Aug. 12, 2021 (BR) .......................... 1020210158816

(51) Int. Cl.
 *C09K 8/584* (2006.01)

(52) U.S. Cl.
 CPC ..................................... *C09K 8/584* (2013.01)

(58) Field of Classification Search
 CPC ....................................................... C09K 8/584
 See application file for complete search history.

(56) References Cited

U.S. PATENT DOCUMENTS

| | | | |
|---|---|---|---|
| 10,731,071 B2 | 8/2020 | Saboowala et al. | |
| 2010/0006286 A1* | 1/2010 | Oliveira ................. | C09K 8/588 |
| | | | 507/261 |

(Continued)

FOREIGN PATENT DOCUMENTS

| | | |
|---|---|---|
| BR | PI0605007 A | 7/2008 |
| BR | PI0802390 A2 | 3/2010 |

OTHER PUBLICATIONS

Perkins et al., (Feb. 1, 1985) "The Effect of Thermoelastic Stresses on Injection Well Fracturing", Society of Petroleum Engineers Journal, , 25(01):78-88.

(Continued)

*Primary Examiner* — Alicia Bland
(74) *Attorney, Agent, or Firm* — Morrison & Foerster LLP

(57) ABSTRACT

The present invention addresses to an oil-in-water microemulsion composition to increase the injectivity of produced water in reservoirs of oil production fields, contemplates a solution that has the potential to reduce the water-oil interfacial tension, to increase the mobility of produced water in the reservoir and to restore the wettability of the reservoir rock.

8 Claims, 11 Drawing Sheets

(56)          References Cited

U.S. PATENT DOCUMENTS

2013/0146545 A1*   6/2013   Pabalan ............. C11D 17/0021
                                                       210/698
2015/0226061 A1*   8/2015   Shook ..................... E21B 43/20
                                                       702/12
2018/0134941 A1*   5/2018   Saboowala ............ C09K 8/584
2018/0201829 A1*   7/2018   Hikem ................... C09K 8/602
2023/0051978 A1    2/2023   Khalil De Oliveira et al.

OTHER PUBLICATIONS

Zhou et al., (Apr. 7, 2000) "Screening Commercial Surfactants Suitable for Remediating DNAPL Source Zones by Solubilizationt", Environmental Science & Technology, 34(10):1985-1990.

* cited by examiner (a)                          (b)                          (c)

Accumulated Volume (m³)

without the addition        with the addition
of the microemulsion        of the microemulsion Accumulated Volume (m³)

... without the addition     ▧ with the addition
of the microemulsion          of the microemulsion

MICROEMULSION COMPOSITION TO INCREASE INJECTIVITY OF WATER PRODUCED IN RESERVOIRS

CROSS-REFERENCE TO RELATED APPLICATIONS

This application is a continuation of U.S. patent application Ser. No. 17/885,797, filed on Aug. 11, 2022, which claims priority to Brazilian Application No. 10 2021 015881 6, filed on Aug. 12, 2021, and entitled "MICROEMULSION COMPOSITION TO INCREASE INJECTIVITY OF WATER PRODUCED IN RESERVOIRS," the disclosures of which are incorporated herein by reference in their entireties.

FIELD OF THE INVENTION

The present invention addresses to a microemulsion composition that can be used as a washer cushion applied in all oil producing fields aiming at increasing injectivity in face of the injection of produced water.

DESCRIPTION OF THE STATE OF THE ART

The injection of water into reservoirs is a technique used to increase oil recovery. It is the most widely used secondary recovery method in the world. In general, seawater is collected and submitted to membrane filtration processes to remove solids and sulfates. The quality of this water meets the requirements for injectivity in reservoirs.

The injection of water in reservoirs, a well-known process in the state of the art, may have low efficiency when the injected water is produced water, which contains oil, solids and chemicals in its composition, leading to the loss of injectivity. With the addition of surfactant products, in the form of a microemulsion, the injectivity is improved as a result of the reduction of the interfacial tension and the alteration of the wettability of the porous medium.

Recently, the possibility of injecting produced water into the reservoirs was evaluated as an alternative to the disposal of this water at sea, especially on platforms where the quality of the produced waters does not meet the current legislation in terms of oil and grease content (OGC). However, the initial tests of injection of produced water have shown significant reductions in the injectivity index of the wells, after the incorporation of the produced water in the injected fluid, compromising the operation and production of these platforms.

Currently, the acidic treatment is the treatment considered in reinjection designs to restore the injectivity of wells. This treatment is carried out from stimulation boats due to the necessary volume. In this operation, acids such as HCl and/or HF are pumped into the reservoir in volumes of about 50 bbl/m² (5,962 m³/m²) of open area to the flow, in order to remove the damage caused at the well-reservoir interface. With the increase in water reinjection demand from 2021 onwards, stimulation boats may become a critical resource to meet the frequency required for the treatment of all wells subjected to produced water reinjection. In addition, the wells have limitations regarding the number of acidic treatments due to problems associated with the corrosion process and the great wear of the strings of the platforms that will be subjected to reinjection.

In this way, finding alternative, low-cost solutions, with less aggressiveness to metallic lines and with the possibility of treatment from the platform to restore/mitigate the loss of injectivity of the wells can have a significant impact on reinjection designs.

Some characteristics of microemulsions, such as spontaneous formation, clear appearance, thermodynamic stability and low viscosity, made these systems attractive and convenient for many applications. The widespread use and interest in microemulsions are mainly based on the high solubilization capacity of hydrophilic and hydrophobic compounds such as oil and salts, their large interfacial area and ultra-low interfacial tension.

A microemulsion is defined as a visually transparent dispersion of droplets of one liquid dispersed in a second immiscible liquid and stabilized by an interfacial film of surfactant molecules. Generally, in addition to the surfactant itself, the interfacial film is made up of a co-surfactant, such as an intermediate chain alcohol or an amine. The droplet diameter of a microemulsion is on the order of 10 to 100 nm and its formation is independent of the mixing order of its components, but requires high concentration of surfactant, low interfacial tension and an adequate hydrophilic-lipophilic balance (HLB).

Microemulsions and macroemulsions, the latter known in the state of the art as emulsions, are similar simply because they are formed by a mixture of water, oil and surfactant. However, it is important to note that microemulsions are thermodynamically stable and formed spontaneously, while emulsions are not thermodynamically stable, and are only formed if subjected to a stirring procedure (mechanical energy). Furthermore, microemulsions are transparent and emulsions are opaque.

An oil-in-water microemulsion is similar to the normal micelle, where the hydrophilic part of the surfactant is oriented towards the continuous water phase and the nonpolar part is oriented towards the interior of the micelle. The presence of the co-surfactant with the surfactant in the microemulsion provides flexibility to the interface, in addition to reducing the interfacial tension, directing the curvature of the interface to an energetically more favorable dispersion, thus decreasing the interfacial viscosity. As a consequence, the solubilization capacity of a microemulsion is generally much greater than that of micellar solubilization. The microemulsion enhances the advantages of the aqueous solution of surfactant and the pure organic solvent.

Ultra-low interfacial tension and high solubilization capacity are two desirable characteristics in microemulsion systems.

For its preparation, low energy is required, because its formation is spontaneous and its characteristics can be controlled by temperature and salinity. All these characteristics make microemulsions also have applications in improved oil recovery, in the extraction of organic compounds, in chemical synthesis, in the preparation of nanoparticles and further in the solubilization of toxic compounds in order to protect the environment.

Document PI0605007-7 discloses a composition for remediation of soils and solid residues contaminated by high molecular weight hydrocarbons, by means of a microemulsion formed by a surfactant/co-surfactant mixture, an organic compound and an aqueous phase, sufficient to complete 100% by volume. Said microemulsion comprises a co-surfactant, which can be butanol, and a surfactant, which can be formed by one or more substances that can be chosen between a lauryl alcohol ethoxylate (LAE) and an oleyl alcohol ethoxylated (OAE); and an organic chemical compound, which can be formed by one or more substances that can be chosen from decane, toluene, cyclohexane, terpene, and orange oil.

Document PI0802390-5 describes a microemulsion composition that comprises a mixture of a combination of surfactants and co-surfactants, an oil phase, and an aqueous phase; and a method for advanced recovery of heavy oil comprising the steps of injecting a bank containing said microemulsion composition, injecting a bank of a polymeric solution and injecting water. This microemulsion composition can be applied in sandstone and carbonate reservoirs, containing oils with values lower than 22.30° API, in onshore and offshore fields.

SHAW, D. "Introduction to Colloid and Surface Chemistry", 4th ed., 1996, Oxford Butterworth/Heinemann Publishing Ltd describes that the drop diameter of a microemulsion is on the order of 10 to 100 nm and its formation is independent of the order of mixing of its components, but requires a high concentration of surfactant and an adequate hydrophilic-lipophilic balance (HLB). The presence of alcohol as a co-surfactant has the function of decreasing the interfacial viscosity, destabilizing the lamellar crystalline structures, increasing the interfacial area and inducing changes in the curvature of the interface. Phase equilibrium transitions can occur due to variations in salinity, temperature, concentration and type of surfactants and co-surfactants present in the composition.

In the study by ZHOU, M., RHUE, R. (2000), "Screening commercial surfactants suitable for remediation DNAPL source zones by solubilization", Environment Science Technology, v. 34, pp. 1985-1990, demonstrated that the oil solubilization potential is inversely proportional to the square root of the interfacial tension. Therefore, the solubilization ratio (volume of the organic phase solubilized in the microemulsion divided by the volume of surfactant used) increases as the interfacial tension is reduced.

PERKINS, T. K.; GONZALEZ, J. A. (1985) "The effect of thermoelastic stresses on injection well fracturing", Society of Petroleum Engineers Journal, v. 25, pp. 78-88, developed a numerical method to calculate induced thermoelastic stresses within regions of thin elliptical shape. It is evident that this theory can be applied to calculate fracture lengths, downhole pressures (BHPs) and elliptical shapes of the flood front as the injection process progresses.

However, the use of microemulsion to increase the injectivity of water produced in reservoirs has not yet been used. In this way, in order to solve such problems, the present invention was developed by means of a microemulsion composition called a washer cushion with the ability to solubilize the oil present in the water, disperse suspended solids and restore the wettability of the reservoirs, favoring the removal of damage at the reservoir-well interface and increasing the injectivity index of wells subjected to the reinjection of produced water. The ability to remove oil associated with the low pH of some formulations is capable of removing corrosion products, and the reduction of water-oil interfacial tension makes this composition very efficient in restoring permeability. In addition, the washer cushion is a product that has greater efficiency for removing damage caused in this scenario of reinjection of water produced in laboratory tests compared to other products, including commercial ones.

The present invention has as technical advantages the ability to reduce the water-oil interfacial tension and solubilize the oil dispersed in the produced water, reduce capillary pressure, increase the fluid mobility in the reservoir and, consequently, remove/attenuate the damage to injection wells caused in the scenario of injection of produced water.

From an economic point of view, the continuous injection at low concentration in the water, as well as the injection of the cushion directly from the platform, promote significant advantages, since they use smaller volumes of fluids, compared to the acidification process, and further avoid the use of boats that have high daily rental costs. In addition, the washer cushion must be less aggressive in terms of corrosiveness than conventional acidic treatment.

BRIEF DESCRIPTION OF THE INVENTION

The present invention addresses to an oil-in-water microemulsion composition that can be used as a concentrated washer cushion to increase the injectivity of produced water in reservoirs subjected to the reinjection of produced water.

The composition can vary according to the properties of the produced water (chemical composition, salinity, pH) and of the reservoir (composition of the formation water and temperature). This treatment alternative is very important from a strategic point of view for the production of oil and gas, having a positive impact from an environmental point of view.

The present invention applies to all producing fields aiming at increasing injectivity in face of the injection of produced water.

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

Figure 1:
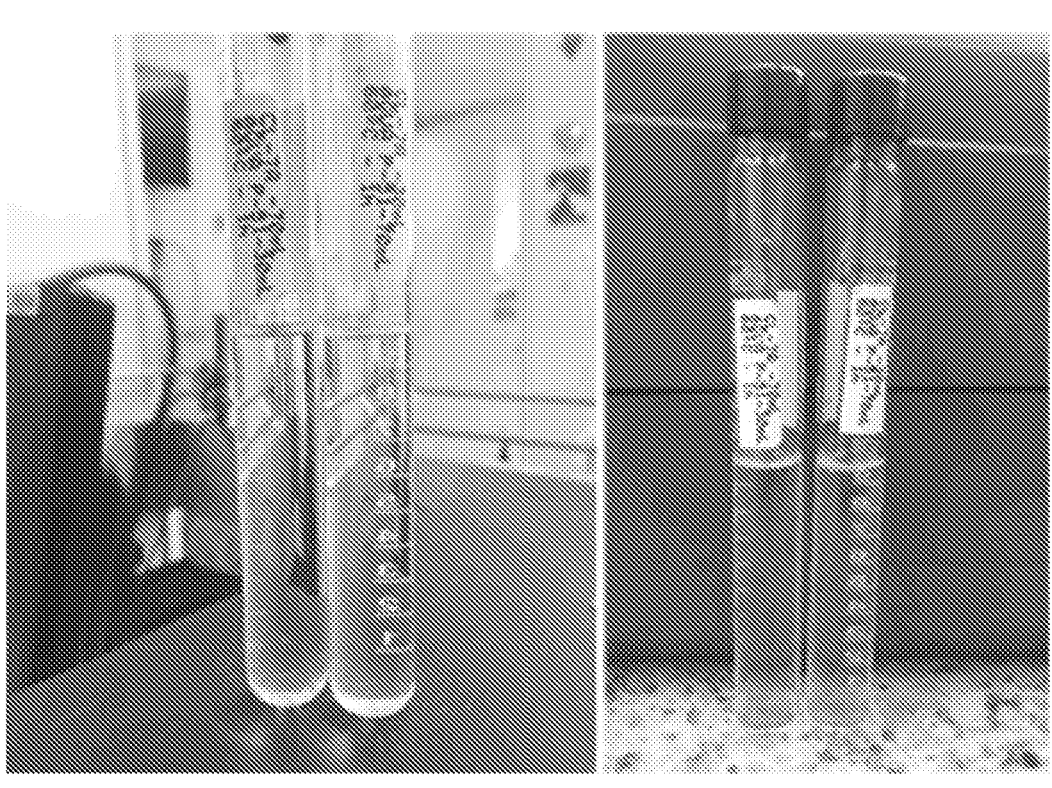
FIG. 1 illustrating an evaluation of compatibility at 60° C. of the formulations with saline water in mixing ratios 30/70 and 70/30.

The oil-in-water microemulsion composition to increase the injectivity of water produced in reservoirs, object of the present invention, contemplates a solution that has the potential to reduce the water-oil interfacial tension, increase the mobility of the water produced in the reservoir and restore the wettability of the reservoir rock. Thus, the composition comprises the following components:

a mixture of one or more surfactants/co-surfactants;
an organic chemical compound such as the oil phase; and
an aqueous phase, sufficient to complete 100% by volume.

The surfactants used can be formed by one or more substances that can be chosen between: a lauryl alcohol ethoxylate (LAE) and a sodium lauryl ether sulfate (SLES). Said mixture has a percentage by volume in relation to the total volume of microemulsion comprised in a range of values between 1% and 70%.

The co-surfactants used are low molecular weight alcohols, such as n-butanol, sec-butanol, iso-propanol and iso-amyl and compounds of the glycol ether family such as butyl glycol.

The surfactant/co-surfactant mixture can be made in different proportions according to the desired tolerance to salinity and temperature of the water produced.

The oil phase can be formed by one or more substances that can be chosen from: organic solvents, n-paraffin, kerosene, refined oils and vegetable oils. The nature of the oil phase should be as similar as possible to the nature of the reservoir fluid.

The oil phase has percentage in volume in relation to the total volume of microemulsion in a range of values between 1% and 50%. The composition has a clear and transparent appearance, with a variable viscosity according to the concentration of the components.

The interfacial tension between the microemulsion and the oil in the reservoir is on the order of 0.01 dyne/cm (1 $\mu$N/cm).

The aqueous phase used includes pure water, saline water, water with neutral pH, acid and alkaline.

The present invention is a promising alternative because it has the ability to restore the wettability of the reservoir to water, which is given by the balance between the interfacial forces between the solid and the oil, the oil and the water and the water and the solid, favoring the increase of injectivity of the produced water. The possibility of wetting a surface depends on the cohesive forces of the fluid and the interactions between the solid surface and the fluid.

The microemulsion composition can be applied in the form of a concentrated washer cushion, in a single operation in large volumes, or by continuous dosing at low concentrations in the produced water. The procedure will be defined according to each application scenario.

EXAMPLES

For validation of the composition and proof of performance in increasing injectivity, object of the present invention, tests were carried out in porous media representative of reservoirs and field test with the continuous dosing at low concentrations in the produced water.

Example 1: Tests Performed in the Laboratory

The first tests were carried out in the laboratory. In addition to the microemulsion described herein, tests were carried out with commercial products and with pure acid. The samples used in these tests had been subjected to the flow of water produced on a platform to quantify the loss of injectivity. In these tests, the reservoir rock sample is connected to the point of interest (e.g., flotator outlet at the production plant) and the produced water flow. The parameters monitored throughout the test are flow and pressure. With the data obtained and using the modeling of loss of injectivity described by PERKINS, T. K.; GONZALEZ, J. A. (1985) "The effect of thermoelastic stresses on injection well fracturing", Society of Petroleum Engineers Journal, v. 25, p. 78-88, it is possible to estimate the injectivity loss in the sample and obtain the water/rock quality parameter.

In the laboratory tests, the samples were initially submitted to the flow of clean water (without solids or oil) to establish the initial permeability threshold. The composition of this water was similar to that of the water produced on a platform.

Figure 2:
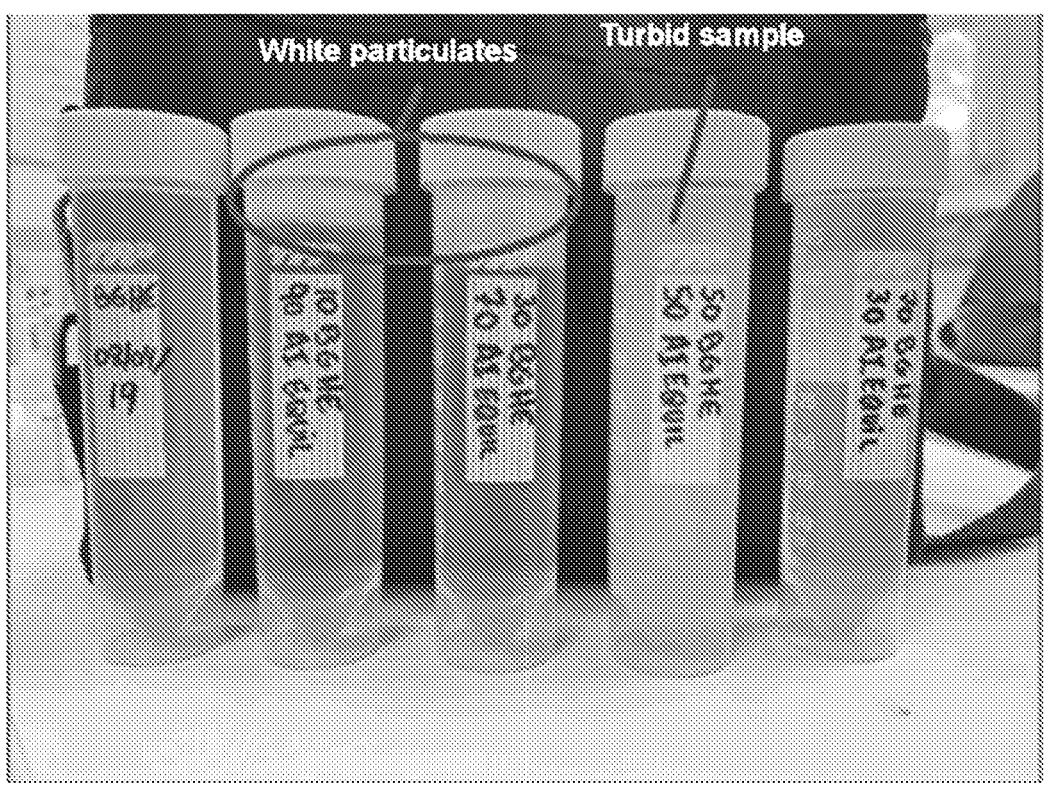
FIG. 2 illustrating a compatibility test between commercial product and saline water in mixing ratios 10/90, 30/70, 50/50 and 70/30.

It should be highlighted that the compatibility of the product with the produced water is fundamental. Thus, in addition to the flow tests in porous medium, compatibility tests were carried out in different mixing proportions, as shown in FIG. 1. One of the commercial products evaluated, for example, proved to be incompatible with water, making its use unfeasible, as seen in FIG. 2. After the water flow, 5 porous volumes of the products of interest were injected. A 24-hour soaking was performed and a new flow of clean water were performed. The same procedure was used for all products. The evaluation of the test consists of comparing the permeability before and after the injection/soaking of the products. If the permeability is the same, it means that there was no restoration. If it decreases, the product has caused increased damage to the sample. When an increase in permeability is observed, the application of the product can be considered successful. The higher the increase, the more effective the product. Both the acidic microemulsion and pure hydrochloric acid (HCl) showed an increase in permeability after soaking. However, the performance of the microemulsion was much higher, probably due to its ability to also act in the solubilization of the oil phase. Acid, on the other hand, will only be effective in removing solids such as corrosion products.

Figure 3:
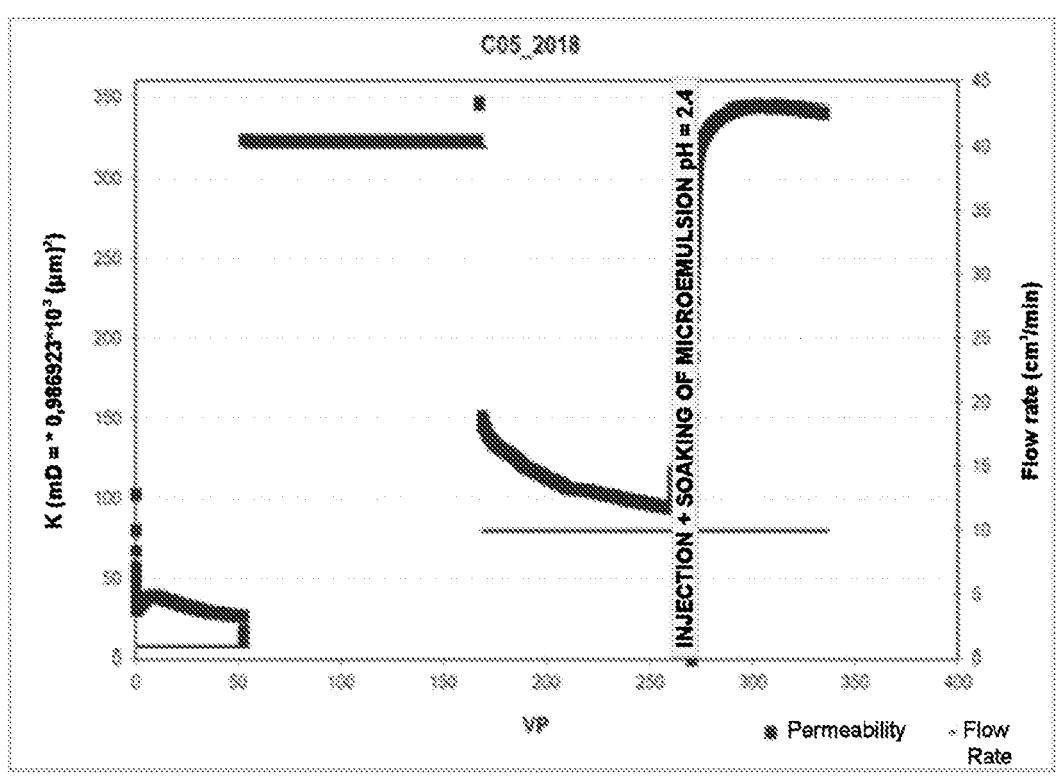
FIG. 3 illustrating a graph of permeability and flow rate as a function of injected porous volume from a laboratory test with injection of acidic microemulsion cushion.

As can be seen in FIG. 3, as a result of the test performed with the acid microemulsion, the curves of permeability versus injected porous volumes are shown. The thin lines indicate the flow rate (1, 10 and 40 mL/min). As can be seen, there is a variation in permeability as a function of injection flow rate. The evaluation of the microemulsion efficiency was performed at a flow rate of 10 mL/min. Prior to product injection, the permeability was close to 100 mD (0.0986923 $\mu$m$^2$). After the injection, the permeability reached 350 mD (0.34542305 $\mu$m$^2$).

Figure 4:
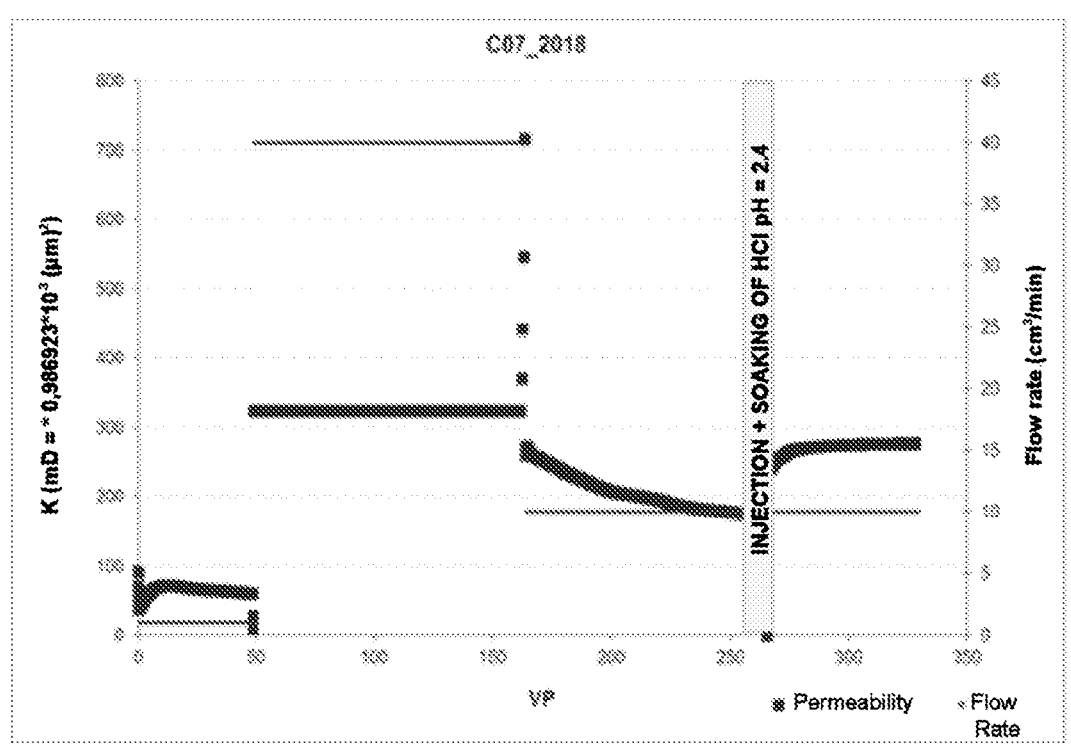
FIG. 4 illustrating a graph of permeability and flow rate as a function of injected porous volume from a laboratory test with injection of hydrochloric acid cushion pH=2.4.

FIG. 4 shows the same results for the test with hydrochloric acid (0.1 mol/L). The pH used was the same in both products: 2.4. There was also an increase in permeability, but it was lower than that observed in FIG. 3.

Example 2: Tests Performed on the Platform with Plug Samples

Figure 5:
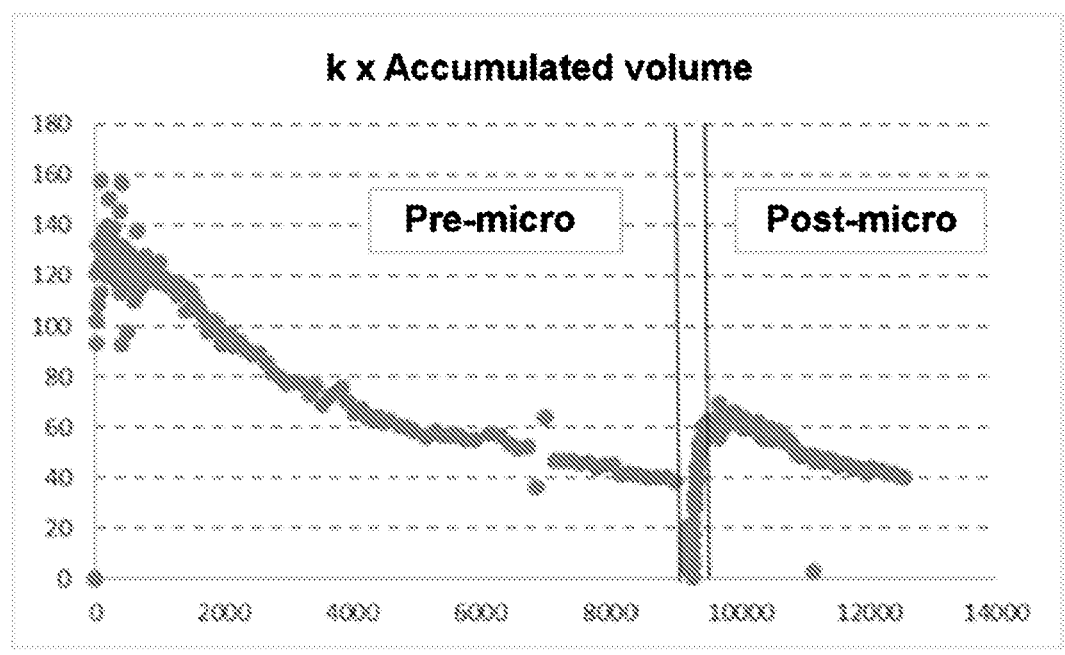
FIG. 5 illustrating a graph of permeability versus accumulated volume injected after a cushion of acidic microemulsion in tests with plug on platform.
Figure 6:
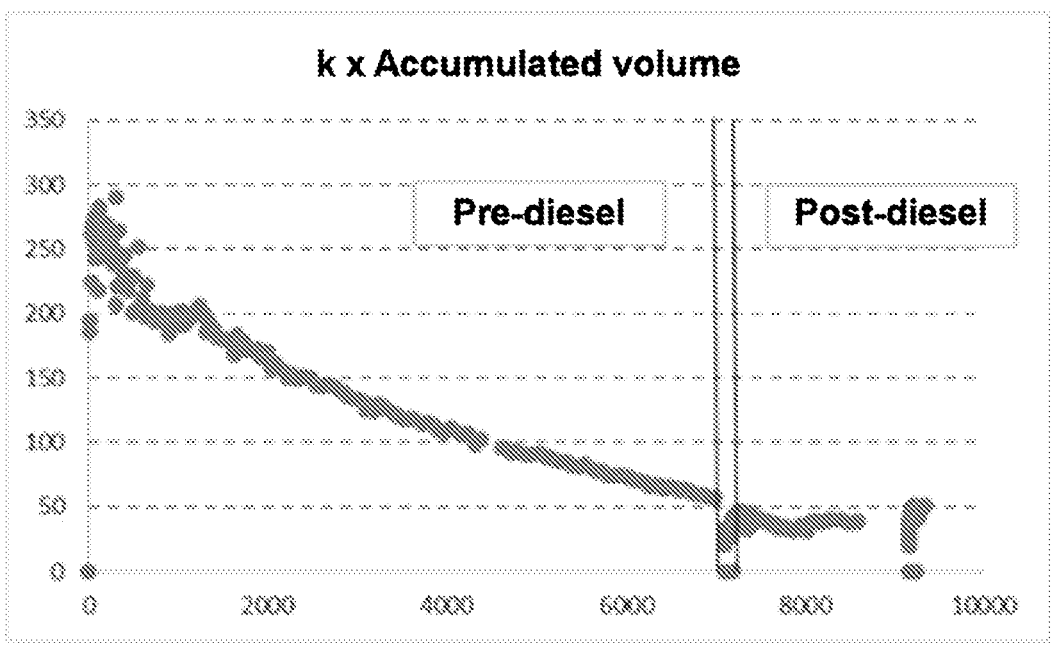
FIG. 6 illustrating a graph of permeability versus accumulated volume injected after a diesel cushion in tests with plug on platform.
Figure 7:
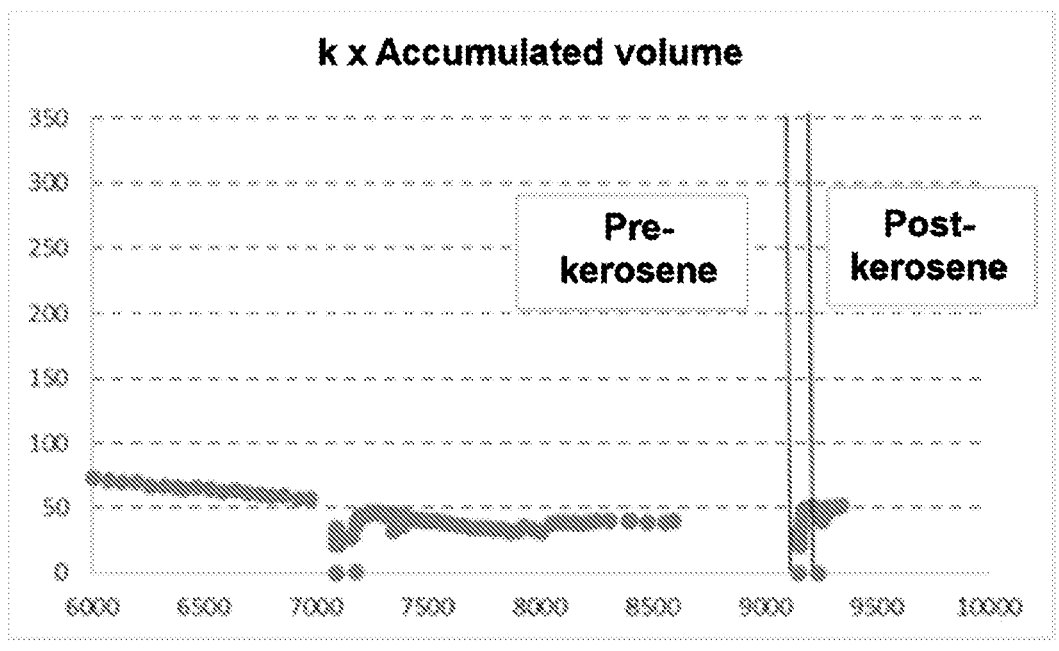
FIG. 7 illustrating a graph of permeability versus accumulated volume injected after a kerosene cushion in tests with plug on platform.

In addition to laboratory tests, tests were performed directly on the platform with plugs. The procedure was similar to that described above: a flow of produced water from the flotator outlet was carried out in a porous medium, the injection of 5 porous volumes of acidic microemulsion and a new flow of produced water. In the same way as in the laboratory tests, the flow and pressure were monitored. An important difference is that there was no soaking period, the second flow of produced water was started immediately after the injection of the porous volumes of microemulsion. The idea was to represent a scenario of product injection via the platform, during which there will be no closing period. In addition to the microemulsion, diesel and kerosene were evaluated. The tests to evaluate the efficiency of the formulation for the removal of damage from the injection of a cushion showed that there was a restoration of about 65% of the permeability of the porous medium after the damage caused by the injection of water produced on a platform (comparison between the final value of permeability after the first flow of produced water and the initial value immediately after product injection), as shown in FIG. 5. No gain was observed with the use of diesel or kerosene (FIGS. 6 and 7).

In addition to the cushion injection test, a test was carried out considering the continuous injection of the microemulsion, using the produced water itself as a base. A concentration of 100 ppm of product was used. While the cushion aims at restoring injectivity, the continuous injection aims at reducing the loss caused by the presence of oil. In this test, the product was mixed with the produced water before being injected into the sample. The flow and pressure were also monitored.

Figure 8:
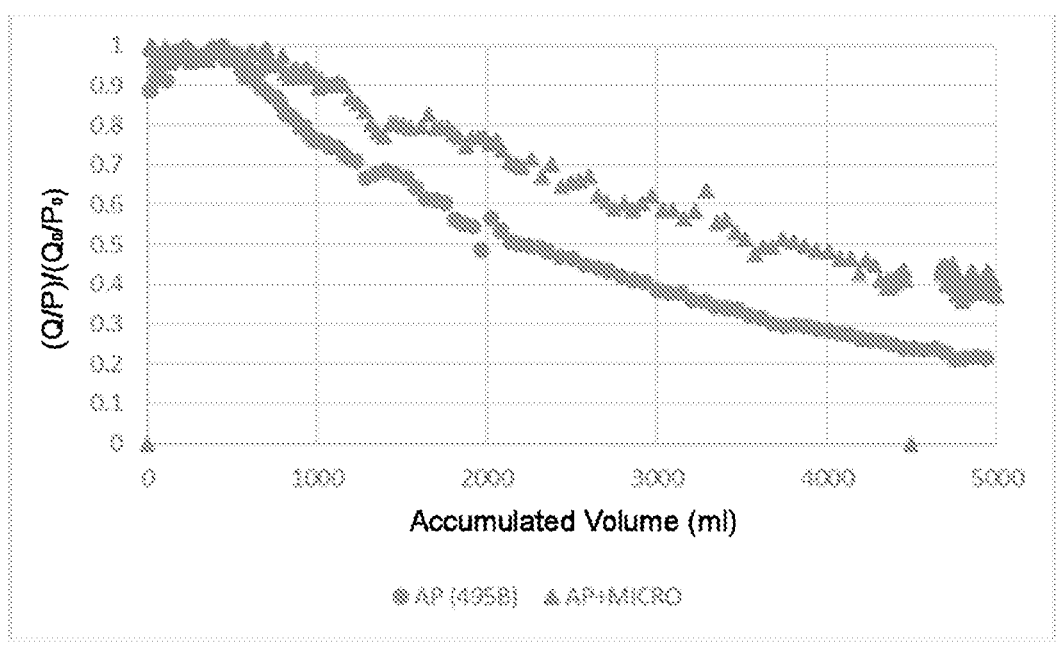
FIG. 8 illustrating a curve $(Q/P)/(Q_0/P_0)$ during the injection of produced water with continuous dosing of 100 mg/l of the microemulsion in tests with plug on platform compared to the curve of $(Q/P)/(Q_0/P_0)$ during produced water flow only.
Figure 9:
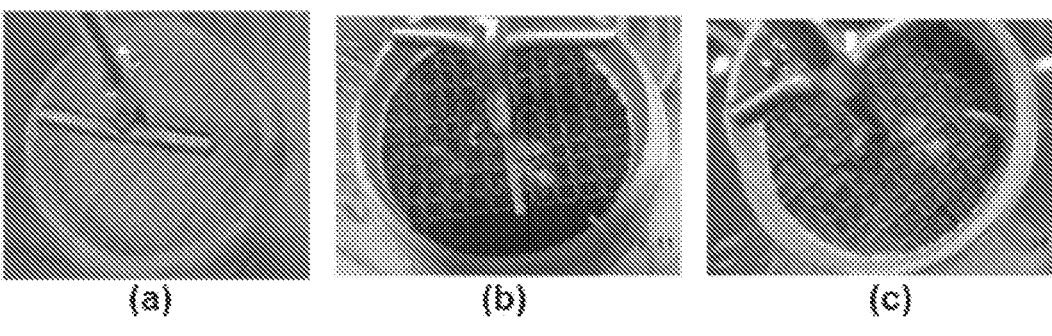
FIG. 9 illustrating the sample interface (a) before the flow of produced water, (b) after flow of only produced water and (c) flow of produced water with the addition of 100 mg/L of the microemulsion.

To evaluate the efficiency of the formulation for the attenuation of damage from the continuous injection of 100 ppm in the produced water, the results showed a less accentuated loss of injectivity, when compared to the test with the porous medium subjected to the flow of produced water only (FIGS. 8 and 9). In this case, the composition added to the produced water acts mainly by reducing the damage effect generated by the oil dispersed in the water.

Example 3: Field Test

On the platform, an injection test was also carried out directly in the injection well. The continuous injection of the microemulsion was carried out at concentrations ranging from 100 to 350 ppm. This test was performed after the well acidification treatment and compared with the injectivity behavior of a previous acidification.

Figure 10:
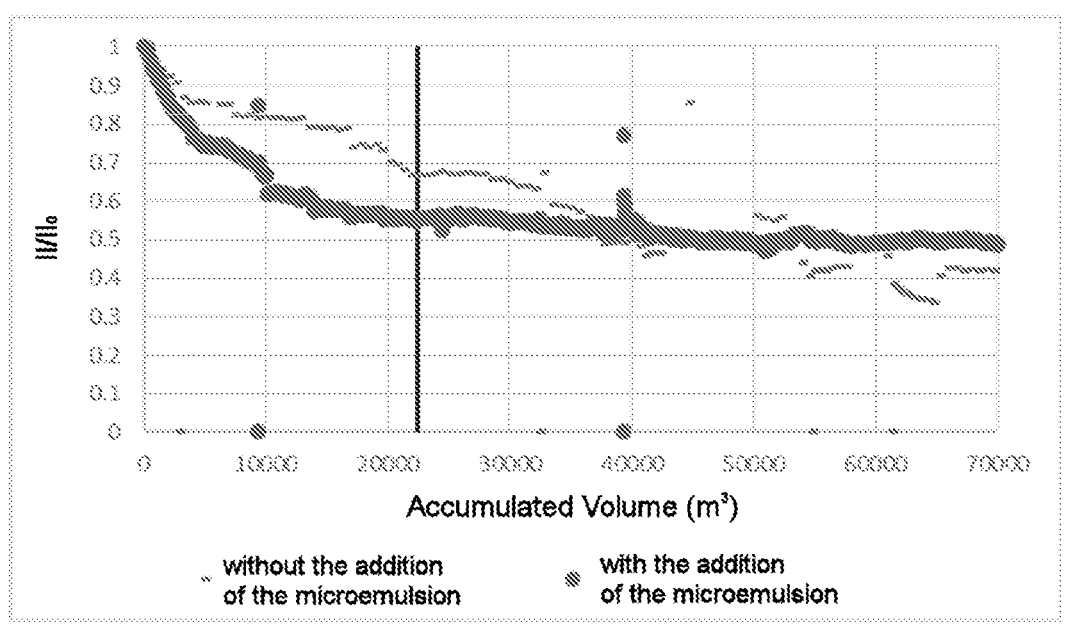
FIG. 10 illustrating the loss of injectivity as a function of the accumulated volume injected of produced water in a well subjected to the continuous injection of microemulsion compared to a previous period in which there was no injection of the product.
Figure 11:
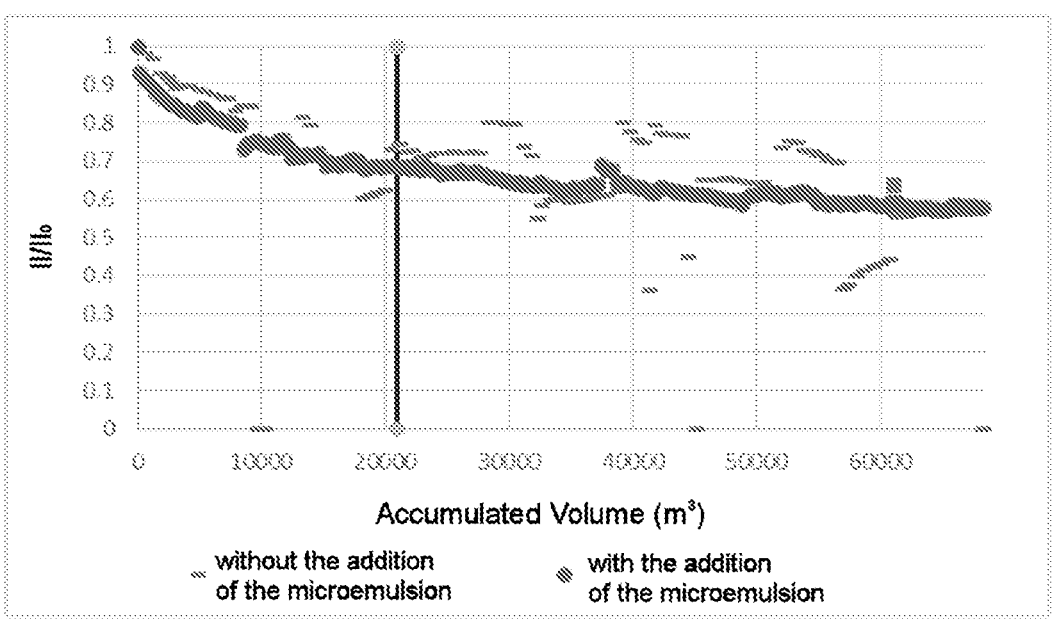
FIG. 11 illustrating the loss of injectivity as a function of the accumulated volume of produced water injected into a well on the same platform as the well tested in FIG. 10, but without the injection of the microemulsion, used for comparison, eliminating possible fluctuations in the quality of the produced water and reservoir parameters.

The efficiency of the product is evident by the change of slope in the curve of loss of injectivity of the well in FIG. 10 from the injection of the microemulsion indicated by the vertical line. The same is not observed in another well that did not have the continuous injection of the microemulsion (FIG. 11) and, therefore, it was used for comparison, eliminating possible oscillations in the quality of the produced water and parameters of the reservoir.

It should be noted that, although the present invention has been described in relation to the attached drawings, it may undergo modifications and adaptations by technicians skilled on the subject, depending on the specific situation, but provided that it is within the inventive scope defined herein.

The invention claimed is:

1. A method comprising:
   obtaining produced water from a production well in a reservoir;
   injecting a microemulsion into the reservoir via an injection well, the microemulsion comprising:
   a surfactant and a co-surfactant comprised in a range of values between 1% and 70% by volume, in relation to a total volume of microemulsion wherein the surfactant comprises a lauryl alcohol ethoxylate (LAE) or a sodium lauryl ether sulfate (SLES) and the co-surfactant comprises a low molecular weight alcohol selected from the group consisting of n-butanol, sec-butanol, iso-propanol, and isoamyl;
   an oil phase comprised in a range of values between 1% and 50% by volume, in relation to the total volume of the microemulsion; and
   an aqueous phase comprising a remainder of the total volume of the microemulsion;
   increasing a permeability of rock within the reservoir to the produced water in response to injecting the microemulsion; and
   reinjecting the produced water from the production well into the reservoir via the injection well simultaneously with the injection of the microemulsion such that the microemulsion is present at a concentration of 100-350 ppm based on a total volume of the injected microemulsion and the reinjected produced water.

2. The method of claim 1, further comprising mixing the microemulsion prior to injecting the microemulsion.

3. The method of claim 1, wherein the co-surfactant further comprises a glycol ether.

4. The method of claim 1, wherein the oil phase comprises an organic solvent, n-paraffin, kerosene, refined oils, or vegetable oils.

5. The method of claim 1, wherein the aqueous phase comprises pure water, saline water, or produced water.

6. The method of claim 1, further comprising adjusting a pH of the aqueous phase.

7. The method of claim 1, wherein an interfacial tension between the microemulsion and the oil in the reservoir is on the order of 0.01 dyne/cm (1 µN/cm).

8. The method of claim 1, wherein the microemulsion and the produced water are mixed before being injected into the reservoir via the injection well.

* * * * *